United States Patent [19]

Hedges et al.

[11] 4,274,488

[45] Jun. 23, 1981

[54] COSURFACTANT IN PREFLUSH FOR SURFACTANT FLOOD SYSTEM

[75] Inventors: James H. Hedges; Gilbert R. Glinsmann, both of Bartlesville, Okla.

[73] Assignee: Phillips Petroleum Company, Bartlesville, Okla.

[21] Appl. No.: 71,608

[22] Filed: Aug. 31, 1979

[51] Int. Cl.³ .............................................. E21B 43/22
[52] U.S. Cl. .................................................... 166/273
[58] Field of Search ............................... 166/273–275, 166/252

[56] References Cited

U.S. PATENT DOCUMENTS

| | | | |
|---|---|---|---|
| 3,330,344 | 7/1967 | Reisberg | 166/274 |
| 3,348,611 | 10/1967 | Reisberg | 166/275 |
| 3,520,365 | 7/1970 | Jones | 166/273 |
| 3,520,366 | 7/1970 | Jones | 166/273 |
| 3,605,891 | 9/1971 | Ayers, Jr. | 166/273 |
| 3,637,017 | 1/1972 | Gale et al. | 166/274 |
| 3,885,628 | 5/1975 | Reed et al. | 166/273 X |
| 3,938,591 | 2/1976 | Ossip et al. | 166/274 X |
| 3,981,361 | 9/1976 | Healy | 166/274 X |
| 4,125,156 | 11/1978 | Glinsmann | 166/273 |

*Primary Examiner*—Stephen J. Novosad

[57] ABSTRACT

In a post-primary oil recovery process involving the sequential addition of a saline preflush, a surfactant system comprising a surfactant, a cosurfactant and brine, the improvement comprising the addition of cosurfactant to the preflush. If desired, cosurfactant can also be added to a subsequent injected mobility buffer. The resulting system gives extraordinarily high recovery of oil.

13 Claims, No Drawings

4,274,488

COSURFACTANT IN PREFLUSH FOR SURFACTANT FLOOD SYSTEM

BACKGROUND OF THE INVENTION

This invention relates to recovery of oil from a subterranean reservoir through the use of a surfactant-cosurfactant system.

It has long been known that the primary recovery of oil from a subterranean formation leaves a substantial amount of the oil still in the formation. This has led to the use of what is commonly referred to as secondary recovery or water flooding wherein a fluid such as brine is injected into a well to force the oil from the pores of the reservoir toward a recovery well. However, this technique also leaves substantial amounts of oil in the reservoir, so-called residual oil, because of the capillary retention of the oil. Accordingly, post-primary surfactant systems have been employed either in place of the secondary recovery or more generally in a tertiary recovery process. One particularly suitable type of surfactant system is that which results in the in situ formation of a microemulsion which is immiscible with the oil it is displacing. Such microemulsion systems are very effective in removing residual oil. However, these systems can suffer from a deterioration of the surfactant system as it moves through the formation due to alteration of the cosurfactant concentration.

The surfactant systems employed to produce microemulsion type oil recovery basically contain at least three separate ingredients, brine, a surfactant and a cosurfactant. It is disclosed in Glinsmann, U.S. Pat. No. 4,125,156, issued Nov. 14, 1978, how to systematically optimize a system so as to give a combination of surfactant, cosurfactant and brine which produce low interfacial tension which is associated with good oil recovery.

SUMMARY OF THE INVENTION

It is an object of this invention to provide an improved surfactant flood system;

It is a further object of this invention to recover an extraordinarily high percentage of oil in a post-primary recovery operation; and It is yet a further object of this invention to minimize the alteration of the cosurfactant concentration as the surfactant system progresses through the oil bearing formation.

In accordance with this invention, a cosurfactant is included in a preflush prior to introduction of a surfactant system.

DESCRIPTION OF THE PREFERRED EMBODIMENTS

The surfactant system used in this invention comprises a surfactant, cosurfactant, water and electrolyte. Such a surfactant system is described in detail in Glinsmann, U.S. Pat. No. 4,125,156, issued Nov. 14, 1978, the disclosure of which is incorporated herewith by reference.

Briefly, the applicable surfactants (agents having substantial surface active characteristics) for the surfactant system can include cationic, anionic or nonionic surfactants, and are preferably petroleum sulfonates having an average equivalent weight within the range of 375 to 500, which surfactants are disclosed in more detail in said Glinsmann patent. The surfactant will generally be present in an amount within the range of 0.1 to 10, preferably 1 to 7, more preferably 1.5 to 4.5 weight percent based on the weight of the surfactant system.

Briefly, the electrolyte of the surfactant system is preferably a monovalent metallic salt most preferably sodium chloride, the applicable electrolytes being disclosed in detail in said Glinsmann patent. Generally, the electrolyte is present in the water of said surfactant system in an amount so as to give a brine containing 5,000 to 25,000 parts by weight total dissolved solids per million parts by weight of the surfactant system although this can vary considerably as disclosed in detail in said Glinsmann patent. The concentration of electrolyte in the preflush can be within the same range as in the surfactant system, i.e., 5,000 to 25,000 parts by weight per million parts by weight of the surfactant system in said preflush. The same type of electrolytes described for the surfactant system are also used in the preflush. Generally, the electrolyte of the surfactant system and the preflush will be the same and the electrolyte concentration will be the same.

The cosurfactants (polar solubilizing agents with little or no surface active characteristics) suitable for use in the surfactant system of this invention, and hence in the preflush or in the preflush and subsequent mobility buffer are as disclosed in said Glinsmann patent. By solubilizing agents is meant agents to solubilize oil and water into the microemulsion. Briefly, these can be esters, amines, aldehydes, ketones, phenols, and the like, such as methyl acetate, ethyl acetate, methyl propionate, ethyl propionate, N,N-diethylamine, isopentylamine, triethylamine, isobutyraldehyde, n-butanal, methyl ethyl ketone, 3-pentanone, p-cresol, and phenol. Unsaturated alcohols can also be used in the instant process. Preferred cosurfactants are alcohols containing 1 to 6 carbon atoms, most preferably containing 3 to 5 carbon atoms. Alcohol cosurfactants which can be used either individually or in various blends in the instant process include methanol, ethanol, n-propanol, isopropanol, n-butanol, isobutanol, 2-butanol, tert-butyl alcohol, n-pentanol, 2-pentanol, 3-pentanol, isopentanol, n-hexanol, isohexanol, 2-hexanol, 3-hexanol, and the like. Representative alcohol blends which can be used include, e.g., isopropanol/isopentanol, 2-butanol/2-pentanol, isobutanol/n-butanol, n-butanol/2-pentanol, 2-butanol/tert-pentanol, 2-pentanol/isopentanol, and other such blends. Alcohols having a solubility of 0.5 to 20 grams per 100 grams of water at room temperature are particularly suitable.

The following ranges are suitable for the cosurfactant in the various slugs (based on the weight of the slugs):

|  | Broad Range | Preferred Range | Most Preferred Range |
| --- | --- | --- | --- |
| Surfactant Slug (Wt. % Cosurfactant) | 0.1–10 | 1–7 | 1.5–4.5 |
| Preflush Slug (Wt. % Cosurfactant) | 0.1–10 | 1–7 | 1.5–4.5 |
| Mobility Buffer Slug* (Wt. % Cosurfactant) | 0.1–10 | 1–7 | 1.5–4.5 |

*If used at all; generally only the preflush will contain the cosurfactant.

EXAMPLE

In order to demonstrate the advantage of practicing the instant inventive process, the following types of core runs were carried out and the results are summarized in Tables I and II.

(a) Control Runs: These runs involved the use of the slug sequence: aqueous saline preflush, alcohol-containing surfactant system and thickened aqueous mobility buffer diluted continuously with brine at constant volume to give an aqueous drive.

(b) Invention Runs: These runs involved the use of the slug sequence: aqueous saline preflush containing alcohol, alcohol-containing surfactant system and thickened aqueous mobility buffer diluted continuously with brine at constant volume to give an aqueous drive.

(c) Invention Runs: These runs involved the same sequence as (b) above except for the addition of alcohol to the thickened aqueous mobility buffer, and the brine used for dilution of the mobility buffer.

TABLE I

Tertiary Oil Recoveries With Slug Sequences Comprising Decane/TRS 10-410 Surfactant System With Alcohol-Containing Preflush Optionally Followed By Alcohol-Containing Mobility Buffer

| Run No. | Run Type | Cosurfactant | % Tertiary Oil Recovery | Optimum Salinity |
|---|---|---|---|---|
| 1 | Control[a] | 2-Butanol | 73.8 | 1.70 |
| 2 | Invention[b] | 2-Butanol | 84.6 | 1.70 |
| 3 | Invention[c] | 2-Butanol | 90.1 | 1.70 |
| 4 | Control[a] | 2-Pentanol | 74.8 | 0.58 |
| 5 | Invention[b] | 2-Pentanol | 94.8 | 0.58 |
| 6 | Invention[c] | 2-Pentanol | 88.3 | 0.58 |
| 7 | Control[a] | n-Butanol | 88.8 | 0.86 |
| 8 | Invention[c] | n-Butanol | 92.1 | 0.86 |
| 9 | Control[a] | tert-Pentanol | 86.6 | 1.25 |
| 10 | Invention[c] | tert-Pentanol | 91.0 | 1.25 |
| 11 | Control[a] | Isopentanol | 72.7* | 0.91 |
| 12 | Invention[c] | Isopentanol | 82.1* | 0.91 |

*Hexadecane was used in these runs (1.5 percent cosurfactant concentration).
[a]These runs contained alcohol in the surfactant system slug only.
[b]These runs contained alcohol in the aqueous preflush and the surfactant system slug.
[c]These runs contained alcohol in the aqueous preflush, surfactant system slug, mobility buffer slug and mobility buffer dilution brine.

TABLE II

Tertiary Oil (n-Decane) Recoveries With Slug Sequences Comprising Surfactant System With Alcohol-Containing Preflush Optionally Followed By Alcohol-Containing Mobility Buffer

| Run No. | Run Type | Cosurfactant | Surfactant | % Tertiary Oil Recovery | Optimum Salinity |
|---|---|---|---|---|---|
| 13 | Control[a] | Isobutanol | TRS 10-395 | 72.6 | 1.10 |
| 14 | Invention[b] | Isobutanol | TRS 10-395 | 97.3 | 1.10 |
| 15 | Invention[c] | Isobutanol | TRS 10-395 | 98.3 | 1.10 |
| 16 | Control[a] | 2-Pentanol | TRS-LB | 70.9 | 0.33 |
| 17 | Invention[b] | 2-Pentanol | TRS-LB | 95.7 | 0.33 |
| 18 | Invention[c] | 2-Pentanol | TRS-LB | 90.8 | 0.33 |

[a]These runs contained alcohol in the surfactant system slug only.
[b]These runs contained alcohol in the aqueous preflush and the surfactant system slug.
[c]These runs contained alcohol in the aqueous preflush, surfactant system slug, mobility buffer slug and mobility buffer dilution brine.

The above indicated core runs were carried out at the optimum (optimal) salinity which was determined from phase behavior of the several surfactant systems studied. Phase behavior was established by the equilibration of equal volumes (usually 25 milliliters) of oil, e.g., decane or hexadecane and surfactant system. The volumes of the phases were recorded and plotted as a function of salinity to give typical phase volume diagrams such as illustrated in FIG. 9a of FIG. 9 in said Glinsmann patent. In general, phase-volume diagrams are characterized by a three-phase region at intermediate salinities separating two-phase regions at high and low salinities. At low salinities, the system consists of a predominantly oil phase in equilibrium with a water-rich (so-called gamma type) microemulsion phase whereas at high salinities, the system consists of an oil-rich (so-called alpha type) microemulsion in equilibrium with a predominantly water phase. At the intermediate salinities, both oil and aqueous phases exist in equilibrium with a middle microemulsion phase (so-called beta type). Within the three-phase region, there exists a salinity referred to as the optimal salinity at which equal volumes of oil and water are solubilized into the middle microemulsion phase. As is shown by comparing FIG. 9a and FIG. 9b of said FIG. 9 of said Glinsmann patent, the designated optimal salinity corresponds closely to that salinity at which the maximum of the coexisting tensions is minimized. Typically, as a function of salinity, oil recovery is maximized near the optimal salinity (see FIG. 9c of said FIG. 9 of said Glinsmann patent). The microemulsion phase, formed on equilibration of the surfactant system with oil corresponding to that in the reservoir, is immiscible with said oil. In contrast to the behavior shown in FIG. 1 of said Glinsmann patent, some systems will exhibit behavior wherein the middle phase rather than the upper phase will diminish in volume in the beta to alpha transition region. This in general does not interfere with the optimal salinity determination. runs 1, 4, 7, 9, 11 gave lower tertiary oil recoveries than did the respective inventive runs 2, 3; 4, 5; 8, 10, 12. The best tertiary oil recovery of 94.8% (Run 5) involved the use of an alcohol-containing preflush with no alcohol added to the mobility buffer. The runs of Table I involved the use of Witco Chemical Company TRS 10-410 petroleum sulfonate.

Referring to the results in Table II, it can be seen that the control runs 13 and 16 gave lower tertiary oil recoveries than did the respective inventive runs 14;15 and 17;18. The runs of Table II involved the use of Witco Chemical Company TRS 10-395 and TRS-LB petroleum sulfonates. The results in Table II indicate that the presence of the cosurfactant in the preflush is responsible for most of the improvement in oil recovery, the presence of the cosurfactant in the following mobility buffer giving only marginal additional improvement if any at all. It does appear in some instances, to be advantageous to include the cosurfactant in the mobility buffer, preferably however, neither the mobility buffer nor the drive fluid contains a cosurfactant.

The aqueous surfactant systems contained 3 percent active sulfonate (by weight), 3 percent cosurfactant (single component or blend), 0.2 percent sodium tripolyphosphate, 0.1 percent sodium carbonate and varying amounts of sodium chloride for salinity adjustment. Sodium tripolyphosphate and sodium carbonate were used as sacrificial agents to reduce surfactant adsorption in oil displacement tests and their use in these tests is optional. The surfactants used in this work were Witco Chemical Company petroleum sulfonates and possessed the properties shown in Table III.

TABLE III

| | Witco Chemical Company Petroleum Sulfonates | | |
|---|---|---|---|
| Ingredient (wt. %) | TRS 10-395 | TRS 10-410 | TRS-LB |
| Active Sodium Sulfonates | 61.7 | 61.5 | 62.0 |
| Oil | 34.0 | 34.0 | 34.0 |
| Water | 4.2 | 4.4 | 4.0 |
| Inorganic Salts | 0.1 | 0.1 | NA* |
| Sulfonate Average | | | |

TABLE III-continued

| Witco Chemical Company Petroleum Sulfonates | | | |
|---|---|---|---|
| Ingredient (wt. %) | TRS 10-395 | TRS 10-410 | TRS-LB |
| Equivalent Weight | 407 | 420 | 440 |

*NA represents not available.

All cosurfactants and inorganic salts used in this work were reagent grade.

All oil displacement tests were conducted in 3 foot long, 3-inch diameter Berea sandstone cores. The cores were prepared in the following manner: (1) saturated with optimal salinity brine, (2) flooded with the oil of interest to an irreducible brine saturation, and (3) water-flooded with brine to waterflood residual oil saturation. A surfactant flood sequence was then initiated and included: (1) an aqueous saline preflush slug containing 3 weight percent alcohol (inventive runs only) and sacrificial agents; (2) an aqueous surfactant slug comprising petroleum sulfonate and cosurfactant; and (3) thickened water mobility slug optionally containing alcohol. All slugs were prepared in optimal salinity brine. The polymeric viscosifier concentration in the mobility buffer slug (0.5 PV) was graded back logarithmically during the displacement test. Initial polymer concentrations were adjusted to yield a viscosity of 40 cp. Table IV summarizes the details of the surfactant flood sequence.

TABLE IV

Slug Sequences for Oil Displacement Tests

Preflush (0.60 PV)
0.2% $Na_5P_3O_{10}$
0.1% $Na_2CO_3$
Optimal Salinity brine
3.0% Cosurfactant Surfactant Slug (0.10 PV)
3% Active Petroleum Sulfonate
3% Cosurfatant
0.2% $Na_5P_3O_{10}$
0.1% $Na_2CO_3$
Optimal Salinity brine Mobility Buffer (0.50 PV*)
Initial viscosity at 40 centipoise.
Prepared in optimal salinity brine optionally containing 3% cosurfactant.

*A volume of mobility buffer equal to 0.5 PV was diluted continuously with brine at constant volume; i.e., polymer concentration was graded back logarithmically.

All displacement tests were conducted at 0.6 ft/day (preflush was injected at 3 feet/day). Cores were rotated (0.25 rpm) during surfactantflood tests to minimize gravity segregation effects. All phase, interfacial tension and oil displacement studies were conducted at 86° F. (30° C.).

In each invention run where a cosurfactant was included in the preflush or the preflush and mobility buffer, it was the identical cosurfactant used in the surfactant system which is the preferred situation. However in the practice of this invention, the cosurfactant of the preflush and/or mobility buffer could be different from that of the surfactant system.

In order to improve the economics, a preflush having no cosurfactant can be introduced ahead of the preflush containing the cosurfactant, i.e., the cosurfactant is used only in the later part of the preflush.

Alternatively, although it is less preferred, the preflush containing a cosurfactant as described herein can be used prior to the injection of an immiscible microemulsion formed above ground. That is, an aqueous surfactant-cosurfactant electrolyte system can be equilibrated with oil and the resulting microemulsion separated and injected.

The preflush is generally used in an amount conventional in the art, for instance, 0.1 to 1.5, preferably 0.4 to 0.8 pore volumes.

While this invention has been described in detail for the purpose of illustration, it is not to be construed as limited thereby, but is intended to cover all the changes and modifications within the spirit and scope thereof.

I claim:

1. A process for recovering oil from a subterranean oil-bearing reservoir comprising the steps of:
   (a) injecting into said reservoir through at least one injection well a preflush comprising water, an electrolyte, and 0.1 to 10 weight percent cosurfactant based on the total weight of said preflush;
   (b) thereafter injecting into said reservoir through at least one injection well an aqueous surfactant system comprising water, electrolyte, surfactant and cosurfactant, which surfactant system is characterized by forming a microemulsion by mixing with oil corresponding to that in said reservoir which microemulsion is immiscible with said oil;
   (c) thereafter injecting into said reservoir through at least one injection well a drive fluid thus forcing said oil toward at least one recovery well; and
   (d) recovering said oil.

2. A method according to claim 1 wherein said electrolyte is present in said preflush in a concentration within the range of 5,000 to 25,000 parts by weight per million parts by weight of said preflush.

3. A method according to claim 1 wherein said electrolyte of said preflush comprises sodium chloride.

4. A method according to claim 1 wherein said cosurfactant is an alcohol having a solubility within the range of 0.5 to 20 grams per 100 grams of water at room temperature.

5. A method according to claim 1 wherein said cosurfactant is selected from the group consisting of 2-butanol, 2-pentanol, n-butanol, tertiary pentanol, and isopentanol.

6. A method according to claim 1 wherein said cosurfactant is present in an amount within the range of 1.5 to 4.5 weight percent based on the weight of said preflush.

7. A method according to claim 6 wherein said electrolyte in said preflush is sodium chloride and is present in an amount within the range of 5,000 to 25,000 parts by weight per million parts by weight of said preflush.

8. A method according to claim 7 wherein said cosurfactant of said preflush is the same as the cosurfactant of the surfactant system.

9. A method according to claim 8 wherein said surfactant system comprises: water; an electrolyte present in a concentration within the range of 5,000 to 25,000 parts by weight per million parts by weight of water; 1 to 7 weight percent based on the weight of said water of a petroleum sulfonate surfactant having an average equivalent weight within the range of 375 to 500; and an alcohol cosurfactant selected from the group consisting of 2-butanol, isobutanol, 2-pentanol, n-butanol, tertiary pentanol, and isopentanol, said cosurfactant being present in an amount within the range of 1 to 7 weight percent based on the weight of said water.

10. A method according to claim 9 wherein a mobility buffer is injected into said subterranean oil-bearing formation subsequent to said injection of said surfactant system and prior to said injection of said drive fluid.

11. A method according to claim 10 wherein said mobility buffer contains a cosurfactant.

12. A method according to claim 10 wherein neither said mobility buffer nor said drive fluid contain a cosurfactant.

13. A method according to claim 1 comprising in addition introducing a preflush containing no cosurfactant ahead of said preflush of (a).

* * * * *